United States Patent
Michalowitz

(10) Patent No.: US 9,871,798 B2
(45) Date of Patent: Jan. 16, 2018

(54) COMPUTERIZED SYSTEM FACILITATING SECURED ELECTRONIC COMMUNICATION BETWEEN AND WITH CHILDREN

(71) Applicant: GOOGALE (2009) LTD., Cesaria (IL)

(72) Inventor: Nir Michalowitz, Cesaria (IL)

(73) Assignee: GOOGALE (2009) LTD., Cesaria (IL)

( * ) Notice: Subject to any disclaimer, the term of this patent is extended or adjusted under 35 U.S.C. 154(b) by 0 days.

(21) Appl. No.: 15/317,392

(22) PCT Filed: Jun. 16, 2016

(86) PCT No.: PCT/IL2016/050631
§ 371 (c)(1),
(2) Date: Dec. 8, 2016

(87) PCT Pub. No.: WO2016/203473
PCT Pub. Date: Dec. 22, 2016

(65) Prior Publication Data
US 2017/0187717 A1    Jun. 29, 2017

Related U.S. Application Data

(60) Provisional application No. 62/181,318, filed on Jun. 18, 2015.

(51) Int. Cl.
*H04L 29/06* (2006.01)
*G06Q 50/00* (2012.01)
*H04L 12/58* (2006.01)

(52) U.S. Cl.
CPC .......... *H04L 63/101* (2013.01); *G06Q 50/01* (2013.01); *H04L 51/32* (2013.01)

(58) Field of Classification Search
CPC ........ H04L 63/101; H04L 51/32; G06Q 50/01
See application file for complete search history.

(56) References Cited

U.S. PATENT DOCUMENTS 5,559,961 A    9/1996 Blonder
8,554,835 B1   10/2013 Williams
(Continued)

FOREIGN PATENT DOCUMENTS

WO    2004/111870 A1    12/2004
WO    2014/144908 A1     9/2014

OTHER PUBLICATIONS

Pearson (PowerSchool Parent Portal User Guide, May 2012, 26 pages).*

(Continued)

*Primary Examiner* — Oleg Korsak
(74) *Attorney, Agent, or Firm* — Oliff PLC

(57) ABSTRACT

A mail server operative to communicate with external recipients via a gateway to external communication network/s; and to communicate with internal recipient/s including pupil end-users via an internal secured network. Associations between individual parents who are nodes in external communication network/s and pupil end-users; and white-lists of authorized communicants for individual pupil end-users, are stored. A whitelist provided to memory for a first pupil end-user includes a second pupil, if and only if the first and second pupils' parents have both, via respective parent user-interfaces, authorized communication between the first and second pupils.

28 Claims, 2 Drawing Sheets

(56) References Cited

U.S. PATENT DOCUMENTS

| | | |
|---|---|---|
| 8,881,251 B1 | 11/2014 | Hilger |
| 2006/0085845 A1 | 4/2006 | Davis et al. |
| 2006/0174339 A1 | 8/2006 | Tao |
| 2006/0267276 A1 | 11/2006 | Farmer et al. |
| 2006/0287030 A1 | 12/2006 | Briggs et al. |
| 2007/0277224 A1 | 11/2007 | Osborn et al. |
| 2009/0217342 A1* | 8/2009 | Nadler .................... G06F 21/40 726/1 |
| 2012/0167199 A1 | 6/2012 | Riddiford |
| 2013/0047252 A1 | 2/2013 | Johnson et al. |
| 2013/0268775 A1 | 10/2013 | Hawkins |
| 2014/0025760 A1* | 1/2014 | Shore ...................... H04L 51/32 709/206 |

OTHER PUBLICATIONS

Al-Khateeb et al. "Enhancing usability and security in click-based visual password systems." IADIS International Conference e-Society, 2010.

Mhlanga. "Graphical Password Authentication for Secure Social Networks," 2013.

Radhika et al. "Compare Usability and Security of Graphical User Authentication Approaches." International Journal of Computer Science and Mobile Computing, Sep. 2014.

http://www.darkreading.com/vulnerabilities-and-threats/windows-8-picture-passwords-easily-cracked/d/d-id/1111351?, Sep. 28.

* cited by examiner

FIG. 2 a. the Email addresses of Neal (Ehud's dad) and Sara have been entered to the system and associated with the respective children
↓
b. Sara invites Neal (father of Ehud). Sara identifies Neal by the combination of Ehud's name and Neal's email. The system tries to identify the child by his first name & his father's email address
↓
c. If the child was not found, the system lets Sara know that Ehud, son of Neal, is not registered to the system and gives Sara options:
  1. An opportunity to modify the request and/or
  2. An opportunity to invite Neal to join
↓
d. If option #2 was selected by Sara, the system sends a proposition mail to the email of Neal (father of Ehud), including e.g. the name of Ehud and a link to the registration site typically including a GUID associated with this specific request.
↓
e. If the system succeeded in identifying the child (Ehud) the system sends mail to Neal (father of Ehud) with an invitation.
↓
d. Neal Accepts the invitation; Neal registers Ehud and creates a new student.
↓
e. Neal enters the parental part of the new student's address book and selects the relevant invitation to this child.
↓
f. A prefix (at least) of the child name is compared to the name on the invitation. If these match, the invitation may be updated and may contain the identity of new student in the system.
↓
g. The parent approves the invitation. Entries are created in an address book that connects the two children
↓
h. The inviting parent receives a mail that his invitation has been approved.

COMPUTERIZED SYSTEM FACILITATING SECURED ELECTRONIC COMMUNICATION BETWEEN AND WITH CHILDREN

REFERENCE TO CO-PENDING APPLICATIONS

None.

FIELD OF THIS DISCLOSURE

The present invention relates generally to child-operated systems and more particularly to child-operated computerized systems.

BACKGROUND FOR THIS DISCLOSURE

Conventional technology constituting background to certain embodiments of the present invention is described in the following publication inter alia:

The Googale.co.il website describes an enterprise, Googale, providing a protected computerized social network facilitating secured electronic communication between and with children including providing computerized tools to licensed users, typically young children who may be pre-literate; the tools may be integrated with the children's studies in kindergarten and school and with the child's activities at home. The Googale enterprise provides email, search engine, word processor and electronic spreadsheet capabilities to young children.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide an improved protected computerized social network facilitating secured electronic communication between and with children. For example, an educational interactive platform may be provided for use in educational facilities such as elementary schools, special education facilities, and kindergartens, with parental- or teacher-supervision of specific functionalities, typically including a social network for children.

Certain embodiments of the invention seek to provide a non-alphanumeric user interface for non-literate or semi-literate users, enabling these users to perform conventional computerized activities such as searching, surfing and processing data.

Certain embodiments of the invention seek to provide a networking functionality that each child may enter. The child may be shown a display of all children in her or his class, each identified by her or his name (first name only, or first and last names for older children) as entered by the teacher, and/or by her or his icon. The networking functionality allows each child to communicate with others, including interfacing safely with external communication networks e.g. email.

Certain embodiments of the invention seek to provide a computerized communication system for young children in which children communicate within a closed environment; e.g. with internal recipients who are all children and/or with recipients who are all deemed safe by a trusted authority such as a local authority, which may be authorized by a trusted central authority, such a local authority having credentials, typically sole credentials, for:

a. deeming certain recipients safe for a local group of children; and/or b. authorizing a child-specific authority, which then has credentials, typically sole credentials, for deeming certain recipients safe for that specific child.

For example, the Board of Education might give teachers sole authorization for building an address book for the child-users in their respective classes, and teachers might be authorized to give specific parents sole authorization for adding communicants e.g. external recipients they know and trust, to their child's address book.

The system may "whitelist" communication between internal recipients x, y only if x's address book includes y and vice versa.

Certain embodiments of the invention seek to provide a trusted authority which defines teachers. Teachers define pupils and parents. Typically, the system is pre-configured such that no communication is possible other than communication between authorized pairs of communicants. Rules defining authorized pairs of communicants may be as follows: pupils of a single teacher can all communicate with one another and, optionally, can also each communicate with their own parent/s and/or teacher. The system may also be pre-configured to enable first and second parents of first and second respective children studying in first and second classes enrolled in the system, to authorize communication between the first and second respective children if and only if so authorized by both children's parents. Example: Robbie and Janine who are in different classes may be able to communicate, if and only if Robbie is on Janine's parents' whitelist, and Janine is on Robbie's parents' whitelist. The system may also be pre-configured to enable a parent to authorize communication between his child and specified users, identified e.g. by their email addresses or other contact information and aliases (such as cousin Jack). Typically, the system includes an internal communication system supporting communication among internal recipients e.g. registered teacher-users and among registered pupil-users and also between these groups, all only if and as authorized by the rules. The system also may include an external communication system supporting communication between registered users such as teachers and children, and external recipients such as parents, relatives and neighbors, or even among external users, all only if and as authorized by the rules.

Typically, the system enables each teacher to efficiently send an introductory message to each parent in her class, using contact information that the parents previously provided, and to provide to each parent, a user name and (typically alphanumeric) password, thereby granting that parent access to the parents' user interface. This prevents children from gaining access to the parents' user interface. The parent's user interface allows a (first) parent to request contact between his (first) child and a second child belonging to a different class (and/or Parent email). Typically, the second child may be identified by his or her name and class. The system then retrieves the parental contact information for the second child and asks the second child's parent to authorize contact between his child and the first child. The request to the second child's parent may include a message sent by the first parent; this allows the first parent to concoct a message which allows the second parent to authenticate the first parent e.g. by referring to past experiences or knowledge shared by both parents or both children.

Requesting contact and authorizing a contact requested by another parent can only be effected from within the parent user interface to prevent unauthorized persons from authorizing contact between respective children.

According to certain embodiments, the request to the second child's parent may be an email including a link; if a suitable cookie (say) indicates that the parent is logged in, then the parent is brought straight to the page within the parent user interface which enables him to authorize contact with whichsoever children whose parents have requested contact. If the parent is not logged in, then the parent is routed first to the parent user interface login page, and only subsequently, straight to the page within the parent user interface which enables him to authorize contact with whichsoever children whose parents have requested contact.

According to certain embodiments, if responsible adults' emails have been defined, the system, typically via an automatic process, sends mails to the responsible adults with the user name and password for their child and pin for the parent, and instructions on how to use the system. Responsible adults are requested to assist their child during the first time they login to the system. In case that responsible adults (=parents) emails were not added, the teacher can print notes (per child) with username password and instructions and hand them to the responsible adults.

There are typically 2 types of recipients recognized by the system: Internal recipient—receives his mail inside the system; and External recipient.

There may be 2 types of students (internal recipients) in the system: Student defined within class who work either from a class workstation or, optionally, from home; and a Private user who does not belong to any class defined by the system and typically works only from home.

According to certain embodiments, the system is operative for allowing child end-users to communicate only with a white-list defined for them. The white list may include a list pre-defined per kindergarten not per-child and includes all the children in that kindergarten and optionally adults serving that kindergarten. The white list may be pre-defined by a trusted authority, either directly or via a teacher designated for that kindergarten by a trusted authority.

Alternatively or in addition, each child's white list includes communicants defined for each child personally by a pair of adults designated as being responsible for the 2 relevant children; each such adult may be one known by a trusted authority to be the child's parent/guardian.

The present invention typically includes at least the following embodiments:

Embodiment 1

A secure social networking system for pupils including:
a mail server including a processor, operative to:
  a. communicate with external recipients via a gateway to at least one external communication network serving the external recipients; and
  b. communicate with at least one internal recipient including pupil end-users, thereby to define an internal secured network;
computer memory/storage accessible by the server and operative to store:
  associations between individual parents who are nodes in the at least one external communication network and individual internal recipients from among the pupil end-users; and
  white-lists of authorized communicants for individual pupil end-users, provided by the server;

wherein the server is operative to interface with:
  a secured parent environment including a parent's user-interface, operative, responsive to control by a processor, to allow each of said individual parents whose association with a given pupil from among the pupil end-users is stored in said memory, to authenticate himself and subsequently to define for the server, a white-list of pupils with whom the individual parent authorizes his child (said given pupil) to communicate; and
  a secured pupil environment including a pupil's user-interface, operative, responsive to control by a processor, to allow each first pupil to communicate via said server with any pupils appearing on the whitelist of internal recipients stored in the memory for the first pupil;
wherein for at least one first and at least one second pupil end-user from among the pupil end-users, the server's logic is configured such that the whitelist provided to the memory for the first pupil end-user includes the second pupil, if and only if, the first and second pupils' parents, as defined by said associations, have both, via their respective parent's user-interface, authorized communication between the first and second pupils, thereby to define the first and second pupils as an authorized pair of communicants.

Embodiment 2

A system according to any of the preceding embodiments and also comprising a secured teacher environment including a teacher's user-interface operative, responsive to control by a processor, to allow each of a plurality of teacher-users, pre-defined by a trusted authority, to define a class having a plurality of pupils including defining, for each pupil in the plurality of pupils, a pupil's contact information; and parent contact information through which the server contacts the pupil's parent via the external communication network.

Embodiment 3

A system according to any of the preceding embodiments wherein, for any pair of first and second pupils from among the pupil end-users belonging to different classes, the server's logic is configured such that the whitelist provided to the memory for the first pupil end-user includes the second pupil, if and only if, the first and second pupils' parents as defined by said associations, have both, via their respective parent's user-interface, authorized communication between the first and second pupils, thereby to define the first and second pupils as an authorized pair of communicants.

Embodiment 4

A system according to any of the preceding embodiments wherein the whitelist includes all pupils within the individual pupil's class.

Embodiment 5

A system according to any of the preceding embodiments and also comprising a workstation operative to communicate with the server via the external communication network and operative to provide a parent end-user with the secured parent environment including the parent's user-interface operative to allow the parent end-user, once his association with a given pupil from among the pupil end-users is stored in said memory, to authenticate himself and subsequently to define pupils with whom the parent end-user authorizes his child to communicate.

Embodiment 6

A system according to any of the preceding embodiments wherein the parent user-interface is operative:

to allow each individual parent whose association with a given pupil and a given class is defined by said teacher user-interface, to send requests, through the system, to parents of pupils belonging to classes other than said given class asking those parents to authorize their children respectively to communicate with the given pupil; and to allow each particular parent who has received an individual request sent by the individual parent, to approve the individual request, thereby to define the individual parent's child (said given pupil) and the particular parent's child as an authorized pair of communicants.

Embodiment 7

A system according to any of the preceding embodiments and also comprising an internal communication system supporting communication among registered teacher-users pre-defined as authorized pairs of communicants.

Embodiment 8

A system according to any of the preceding embodiments and also comprising an introduction functionality operative to:

receive, from each teacher, externally provided contact information that the parents previously provided to the teacher;

store the externally provided contact information; and facilitate the teacher's transmission of introductory messages to each parent in the teacher's class, using said externally provided contact information, wherein the introductory message sent to each specific parent, assigns to the specific parent a user name and password, granting that specific parent access to said parent-user interface.

Embodiment 9

A system according to any of the preceding embodiments wherein said contact information comprises an email address.

Embodiment 10

A system according to any of the preceding embodiments wherein said contact information comprises a cell phone number.

Embodiment 11

A system according to any of the preceding embodiments and wherein said computer memory includes:

a teacher database including a teacher data record for each teacher in a supported teacher population and wherein each teacher data record is operative for storing a teacher's contact information;

a pupil database including a pupil data record for each pupil in a supported pupil population and wherein each pupil data record is operative for storing a pupil's contact information and an association between the pupil and an individual teacher in the supported teacher population; and a parental database including a parent data record for each parent in a supported parent population and wherein each parent data record is operative for storing a parent's contact information and an association between the parent and an individual pupil in the supported pupil population.

Embodiment 12

A system according to any of the preceding embodiments wherein, if an individual parent is known to be logged in to the system, the individual parent is brought straight to a web-page within the parent user interface which enables the individual parent to authorize contact with whichsoever pupils whose parents have requested contact with the individual parent's child.

Embodiment 13

A system according to any of the preceding embodiments wherein, if an individual parent is deemed not to be logged in to the system, the parent is routed first to a login page of the parent user interface login page, and only subsequently, straight to a web-page within the parent user interface which enables the individual parent to authorize contact with whichsoever children whose parents have requested contact with the individual parent's child.

Embodiment 14

A system according to any of the preceding embodiments and also comprising a workstation operative to communicate with the server via the internal secured network and operative to provide a secured pupil environment including a pupil's user-interface operative to allow each first pupil to communicate via said server with any pupils appearing on the whitelist of internal recipients stored in the memory for the first pupil.

Embodiment 15

A system according to any of the preceding embodiments wherein the system is pre-configured such that no communication is possible other than communication between authorized pairs of communicants.

Embodiment 16

A system according to any of the preceding embodiments wherein authorized pairs of communicants include any pair of pupils of a single teacher.

Embodiment 17

A system according to any of the preceding embodiments wherein authorized pairs of communicants include any pupil and her/his teacher.

Embodiment 18

A system according to any of the preceding embodiments wherein authorized pairs of communicants include any pupil and her/his parent.

Embodiment 19

A system according to claim 1 and wherein said computer memory includes a teacher database including a teacher data record for each teacher in a supported teacher population and wherein each teacher data record is operative for storing a teacher's contact information.

Embodiment 20

A system according to any of the preceding embodiments and wherein said computer memory includes a pupil database including a pupil data record for each pupil in a supported pupil population and wherein each pupil data record is operative for storing a pupil's contact information and an association between the pupil and an individual teacher in a supported teacher population.

Embodiment 21

A system according to any of the preceding embodiments and also comprising a gateway via which the mail server communicates with the external recipients and wherein the gate-way is one-way allowing internal recipients to send communications via the server to external recipients but not allowing external recipients to send communications to internal recipients.

Embodiment 22

A computer program product, comprising a non-transitory tangible computer readable medium having computer readable program code embodied therein, said computer readable program code adapted to be executed to implement any method shown and described herein.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory e.g. for storing the data repositories shown in FIG. 1, such as but not limited to optical disks, CDROMs, DVDs, BluRays, magnetic-optical discs or other discs; RAMs, ROMs, EPROMs, EEPROMs, magnetic or optical or other cards, for storing. keyboard or mouse or other input device may be employed. Modules shown and described herein may include any one or combination or plurality of: a server, a data processor, a memory/computer storage, a communication interface, a computer program stored in memory/computer storage e.g. for storing the data repositories shown in FIG. 1.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein e.g. by providing one or more modules in the processor/s to perform functionalities described herein. Any suitable computerized data storage/computer memory may be used to store information received by or generated by the systems shown and described herein e.g. for storing the data repositories shown in FIG. 1. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 2 is a simplified flowchart illustration of an example method allowing parents to define their respective children as a pair of authorized communicants; responsively the server typically adds the first child to the second child's white-list and vice versa. The method of FIG. 2 typically comprises some or all of the illustrated operations, suitably ordered e.g. as shown.

Figure 1:
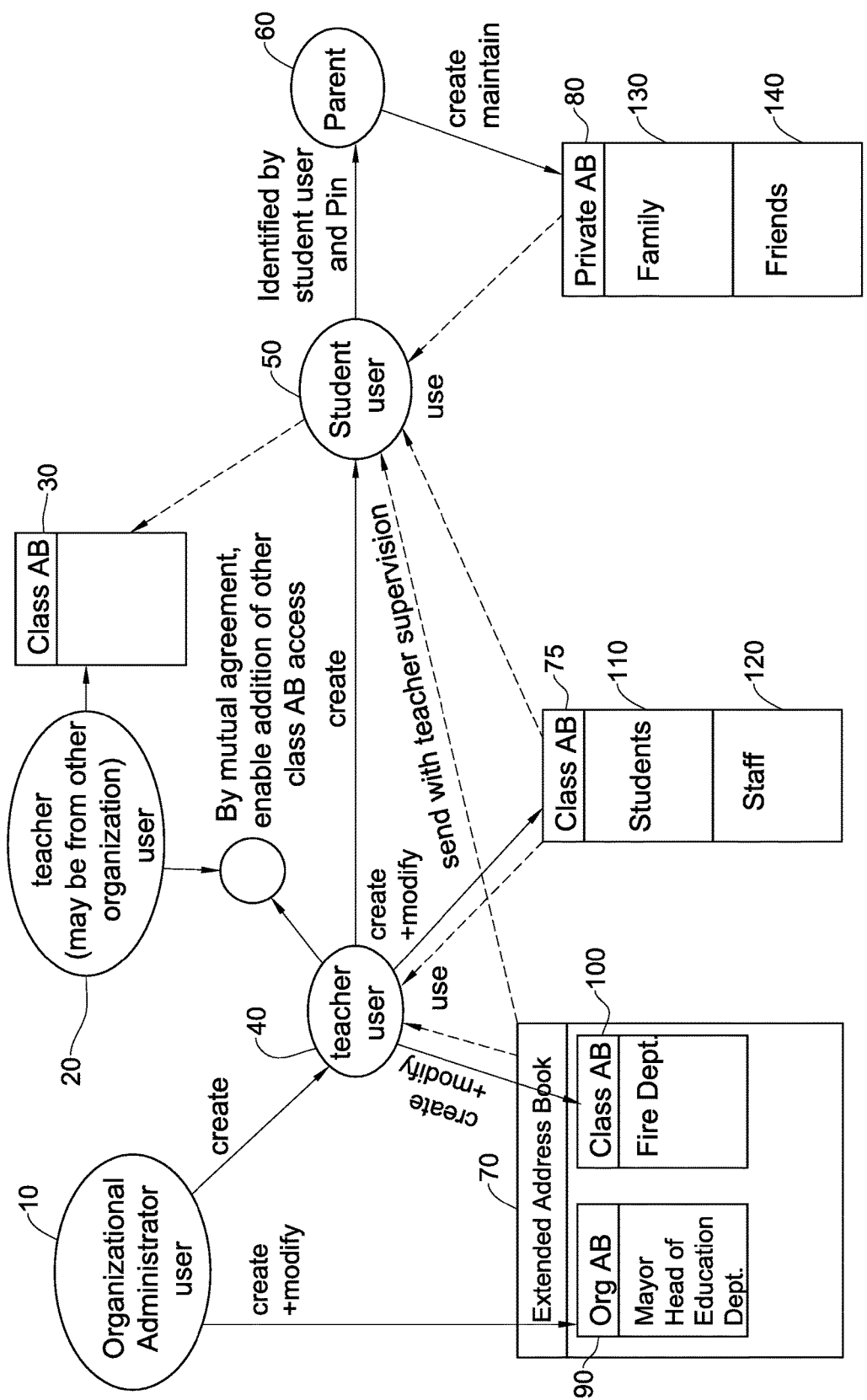
FIG. 1 is an example scheme for supporting secured communication to and from child-users in accordance with certain embodiments of the present invention.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

According to certain embodiments, a secure social networking system suitable for preschool children is provided, including some or all of:

a. a teacher user-interface operative to allow each of a plurality of teacher-users, pre-defined by a trusted authority, to define a class including a plurality of pupils including defining, for each pupil in the plurality of pupils, a pupil's contact information; and at least one parent having parent contact information.

b. a parent user-interface operative to allow each individual parent whose association with a given pupil and a given class is defined by said teacher user-interface, to define pupils belonging to classes other than said given class with whom the individual parent authorizes his child (said given pupil) to communicate; and c. a child user-interface operative to allow each individual pupil within an individual class defined by an individual teacher, to communicate with all pupils within the individual pupil's class as defined by the teacher user-interface and also to conduct communication with at least one specific pupil, who belongs to a specific class other than the individual class, this specific class having been defined by a specific teacher other than the individual teacher, wherein said communication is only authorized if the individual pupil's parents, defined by the individual teacher using the teacher user-interface, and also the specific pupil's parents, defined by the specific teacher using the teacher user-interface, have both authorized said communication, thereby to define the individual pupil and the specific pupil as an authorized pair of communicants.

Functionality may be provided for preventing teachers from accessing the parent and child user interfaces. Teacher credentials, once entered by an end-user, assign to the end-user a teacher role. When a parent logs into the system, he typically uses his child credentials that have a student role. The parent is typically required to add a parent pin—to prove that he is the parent of the child. At that point, the system typically grants editing access to the child's private address book, to that parent. The child himself typically has read only access to his address book. Typically, teacher credentials have a single link to a single class address book and can access only that address book.

Functionality may be provided for preventing children from accessing the teacher and parent user interfaces; each teacher and each parent has their own PIN, which is intended to be a secret from the teacher's/parent's child/ren.

Functionality may be provided for preventing parents from accessing the teacher user interface. Typically, parents and teachers can access a child's UI but a teacher can not access a parent UI (user interface).

So for example, the system may be configured to allow each child to receive communication ("email" e.g.) from his teacher and staff of his kindergarten or class, his classmates and his parents, but not from unauthorized persons not in his class, since the system typically checks for each communication e.g. email, that sender and recipient are from same class or appear in each other's Private address book. In order for someone who is not a user (who is an external recipient e.g.) of the system, e.g. parent or grandmother, to send an mail to a child, this is typically only possible if Grandma first received an mail from the child; this email or communication includes a "reply link"—URL which contains a global Unique ID unique to the child. The external recipient can then surf to the reply link url, at which point the system prompts the external recipient to provide her or his destination/contact information via an external network e.g. the external recipient's SMTP email address. Then, before the "email" including content keyed in by the external recipient, is delivered to the child, the system checks to verify that the external recipient's destination/contact/email address indeed appears in the private address book of the student whose GUID is part of the URL.

Typically the system is pre-configured such that no communication is possible other than communication between authorized pairs of communicants. Authorized pairs of communicants include any pair of pupils of a single teacher and/or any pupil and her/his teacher; and/or any pupil and her/his parent.

Typically, the parent user-interface is operative:

to allow each individual parent whose association with a given pupil and a given class is defined by said teacher user-interface, to send requests, through the system, to parents of pupils belonging to classes other than said given class asking those parents to authorize their children respectively to communicate with the given pupil; and/or to allow each particular parent who has received an individual request sent by the individual parent, to approve the individual request, thereby to define the individual parent's child (said given pupil) and the particular parent's child as an authorized pair of communicants.

According to certain embodiments, a server-mediated internal communication system is provided, supporting communication among registered teacher-users pre-defined as authorized pairs of communicants.

A server may also provide introduction functionality, operative to:

receive, from each teacher, externally provided contact information that the parents previously provided to the teacher; store the externally provided contact information; and facilitate the teacher's transmission of introductory messages to each parent in the teacher's class, using said externally provided contact information, wherein the introductory message sent to each specific parent typically assigns to the specific parent a user name and password, granting that specific parent access to said parent-user interface.

Each communicant's contact information may comprise an email address, cell phone number, or any other unique designation of a destination for electronic content.

The system may also include some or all of:

a. a teacher database including a teacher data record for each teacher in a supported teacher population and wherein each teacher data record is operative for storing a teacher's contact information;

b. a pupil database including a pupil data record for each pupil in a supported pupil population and wherein each pupil data record is operative for storing a pupil's contact information and an association between the pupil and an individual teacher in the supported teacher population; and c. a parental database including a parent data record for each parent in a supported parent population and wherein each parent data record is operative for storing a parent's contact information and an association between the parent and an individual pupil in the supported pupil population.

If an individual parent is known by the server to be logged in to the system, the individual parent is typically brought straight to a web-page within the parent user interface which enables the individual parent to authorize contact with whichsoever pupils whose parents have requested contact with the individual parent's child. If an individual parent is deemed by the server not to be logged in to the system, the parent is typically routed first to a login page of the parent user interface login page and only subsequently, straight to a web-page within the parent user interface which enables the individual parent to authorize contact with whichsoever children whose parents have requested contact with the individual parent's child.

According to certain embodiments, a secure social networking system for pupils including a mail server is operative to:

a. communicate with external recipients via a gateway to at least one external communication network serving the external recipients; and/or b. communicate with at least one internal recipient including pupil end-users, thereby to define an internal secured network.

Computer memory accessible by the server is operative to store associations between individual parents who are nodes in the at least one external communication network and individual internal recipients from among the pupil end-users; and/or white-lists of authorized communicants for individual pupil end-users, provided by the server.

Typically, the server is operative to interface with:

a secured parent environment including a parent's user-interface operative to allow each of said individual parents whose association with a given pupil from among the pupil end-users is stored in said memory, to authenticate himself and subsequently to define for the server, a white-list of pupils with whom the individual parent authorizes his child (said given pupil) to communicate; and/or a secured pupil environment including a pupil's user-interface operative to allow each first pupil to communicate via said server with any pupils appearing on the whitelist of internal recipients stored in the memory for the first pupil. According to certain embodiments, for communication to be authorized, the communicants must not appear on the black list of any pupil in the pupil pair, Typically, for at least one first and at least one second pupil end-user from among the pupil end-users, the server's logic is configured such that the whitelist provided to the memory for the first pupil end-user includes the second pupil if and only if the first and second pupils' parents, as defined by said associations, have both, via their respective parent's user-interface, authorized communication between the first and second pupils, thereby to define the first and second pupils as an authorized pair of communicants.

Any suitable technology may be employed to implement the above systems.

For example, the technology may include a server e.g. mail server, and an associated gateway typically allowing outgoing communication typically with external network/s via their respective mail servers. Typically the gateway of the system does not allow incoming communication, thereby to generate an internal network secured from incoming communication from external networks.

An identity manager may be associated with the server and may control access of various users e.g. depending on their roles as described herein and subject to their providing authentication e.g. as described herein. Any suitable conventional identity manager access control functionalities may be provided.

The term "server" as used herein includes a mail server and associated gateway e.g. one-way gateway, and associated identity manager.

Each child served by the mail server may be assigned his or her own unique GUID.

According to certain embodiments, each email or other communication sent by the mail server to an external recipient on behalf of a child/student includes a link to a website associated with the server; the link may include a conventional http request requesting a page from the website and the GUID of the child sender may be supplied by the link as a parameter for that page. This link, if stored by a recipient of an email/communication from the child via the mail server of the system e.g. in the recipient's "favorites", enables the recipient to send a communication to the child; however, typically, the recipient is prompted to enter her or his email address so that the system can check that that email address appears on the white list defined for the specific child sender.

More generally, external recipients can typically send a communication to a specific internal recipient if and only if the external recipient can provide the GUID of the internal recipient and the external recipient is whitelisted for that specific internal recipient.

Typically, external recipients cannot reply to communications from an internal recipient; if they attempt to select the "reply button" in their email program, they typically encounter a noreply email address. However, the communication e.g. email sent to the external recipients typically includes a link as above and/or a "click here to reply to this child" button, both typically leading the external recipient to the same appropriate web page as described above.

According to certain embodiments, the message sent by the child to the external recipient is represented as an image in any suitable format such as jpeg or png, since the content the child composes may include graphic elements. The child's user interface typically facilitates not only composition of test messages but also graphic composition, using any suitable interface.

According to certain embodiments, the system supports parents inviting one another to whitelist their respective children as an authorized pair of communicants. However, optionally, the system may support this only if the parent receiving such an invitation has opted to receive such invitations.

Typically, the system sends an invitation from one parent to another only if the first parent provides (a) an email address which is recognized by the system as a parental email address; and/or (b) the name of the child is recognized by the system as being the son or daughter of the parent associated with the email address provided. The system may be configured to inform the first parent, if the email address and/or child-name he provides, is not recognized by the system.

The terms internal recipient, pupil, student, student user, and child may be interchanged without departing from the scope of the present invention.

FIG. 1 is an example scheme for supporting secured communication to and from child-users in accordance with certain embodiments of the present invention.

Typically, the system recognizes teacher credentials as having a role of teacher. Typically, when a parent logs into the system, he uses his child's credentials that are recognized by the system as having a role of student. The parent is then typically prompted to add a parent pin establishing that he is the parent of the child. At that point due to the combination of circumstances: role of student+parent pin detected—the parent gets access to the child's private address book (aka "AB").

Typically, teacher credentials have a single link to a single class and therefore can access only their class's data.

Typically, each teacher and each parent are assigned a PIN which they are expected not to share with the child.

Design considerations for the Address Book functionality, some or all of which may be employed, e.g. in conjunction with the embodiment of FIG. 1 and/or of FIG. 2, are now described.

According to certain embodiments, the address book for young children may include a list of addresses or other destinations facilitating communication between a child and others, the list typically including some or all of the following list portions:

The first list portion comprises classmates from the child's own kindergarten; these are typically internal recipients from the system's point of view, the second list portion comprises family members, who are external recipients, and the third list portion comprises friends e.g. neighbors or children of friends of the parents, who are not in the same class; these may be either internal or external.

In order to maintain the children's safety, only approved adults e.g. those approved by the teacher as being the child's parents, are able to modify the list of people a child can communicate with.

The first list portion (all children of the class) may be created by the class teacher or other trusted authority; typically only such a trusted user has authorization to create and modify this list. In order to access this class student list, an approved teacher (say) logs-in; personnel e.g. teachers may get credentials for "owning" a class hence modifying its address book e.g. via a username/password pair given to the teacher when s/he is granted access to the service. This list of students typically serves as the address book of the class. At this stage the teacher typically has an option to add, to each child's address book, a list of email addresses of approved adults (responsible adults) e.g. parents that are granted permission to maintain other list portions of correspondents with their child e.g. friends and relatives.

The system may empower the teacher to add to his or her class list aka "The class address book", an additional list portion of non-teacher assisting staff.

According to certain embodiments, the teacher and/or trusted authority can maintain a third list of external recipients aka the "extended address book of the class", that the students can communicate with, e.g. email address or other destination of the fire department or the museum that the class visited last week. When a child sends a letter to a recipient in this list the teacher is typically required to approve the letter prior to it being sent. This list may include an organizational list of recipients maintained by an "organization owner/organization administrator" aka "trusted authority" e.g. Head of Education Department. When people in this list reply to email, the system is typically configured to route the reply to the teacher (on behalf of the children) and the teacher has an option to forward the reply to the students.

According to certain embodiments, an automatic system process, typically teacher-activated, automatically creates users and assigns usernames and passwords to each child (and staff member) in the class address book. To the extent that responsible adults emails have been added e.g. in association with certain children in the class, the system sends mails to the responsible adults with the user name and password for their child and a PIN for the adult (which could be the adult's email address or other destination) and instructions on how to use the system e.g. responsible adults may be requested to assist their child during the first time they login to the system. In case responsible adults' emails were not added, the system may automatically prepare notes for the teacher to print per child, with username password and instructions, for hand-delivery to the responsible adults. This process creates a user per student and typically enables students to login from home and use the system. Each student typically has his own identity—getting access to some or all of his mail, his private storage, his address book, his class resources and to the system.

Typically, the first time a child logs in from home his the system checks if a responsible adult's email was assigned, and if not, it enables the responsible adult to enter it at this stage. This enables the responsible adults to enter their emails when not entered by the teacher. After logging in from home, responsible adults are typically able to maintain the child's "private address book".

Typically, in order to access the child's private address book, responsible adults need to key in a pin (not known to the child) to prevent children controlling the maintenance of their private address book and hence maintain decision-making as to who is in the "white list" of people that the child can communicate with, in the hands of the parent—thus maintaining child safety and security.

A child's private address book may be presented to her or him as several lists: e.g.: family members and separately, friends, my classmates, staff members of my class, and so forth.

According to certain embodiments, internal and external recipients may be defined in the system and the definition may for example be as follows:

Internal recipient—an end-user e.g. child, teacher, staff member that receives his mail or other communication inside the system e.g. via the system's email server; and External recipient—receives mail outside the system (using SMTP). To maintain safety and security, the system typically includes a one-way gateway which sends mail to SMTP recipients but does not receive incoming mail from SMTP at all, or alternatively, does not receive same other than as described below. When an external recipient receives mail (from an internal recipient) the mail or other communication typically includes a system-added link that typically includes a GUID (Global Unique ID of the sending internal recipient; typically each child-user is assigned a unique GUID). This enables the external recipient to reply to a mail e.g. as follows: When an external recipient clicks on the link, a respond-to-communication functionality of the system is activated which typically requests the external recipient to enter his email. This email is then compared with the GUID that identifies the student to verify that the external recipient appears in the private address book of the intended internal recipient. Only external recipients who are listed at the private address book of a child are able to send mail to the child. Since it is practically impossible to guess pairs of GUID/email addresses, this serves as an effective safety net for incoming mail.

When adding a recipient to a child's private address book, responsible adults may be prompted to indicate whether the recipient is an internal or external (SMTP) user. For internal recipients there may be a special secure whitelisting process, e.g. as shown herein in FIG. 2, that requires mutual agreement of the responsible adults of both sides. There may be two types of students (child end-users) in the system:

1. Student of a class; regarding this type, according to certain embodiments:
   a. Two teachers can mutually agree to connect their classes in which case each student has access to two class address books (his organic class and the "other class"); and/or
   b. The class address books may include "special entries" for sending to an alias for example—"All members of the address book".

2. Private home user. This is a student that has a private user account rather than having been enrolled as part of a class; he therefore has no class address book and no organizational address book, and has only a private address book.

Typically, the system supports creation of an internal recipient—private address book entries, for example when there are two friends that are members of two separate classes and wish to communicate with each other. Another case is where one of the children is a private home user, or where one child is a user of the system and he wishes to "invite" a friend to use the system and communicate with him. In this case, the system typically requires the children's responsible adults to be involved in the process of approving and creating the address book entries for their children.

A secure process e.g. that of FIG. 2 may be employed to enable two responsible adults to identify themselves (e.g. by receiving specific information in email, by logging into the system using their children credentials and their secret pin to get access and approve the connection). The process may then securely enable two responsible adults (an initiator responsible adult and an approver responsible adult) to link their children into an authorized pair (mutually whitelisted). When one of the responsible adults deletes an internal connection between children (blacklists a child) the connection is erased from both sides and the two children, as an authorized pair, no longer exist in the system.

FIG. 2 is a simplified flowchart illustration of an example method allowing parents to define their respective children as a pair of authorized communicants; responsively the server typically adds the first child to the second child's whitelist and vice versa. In the example, Sara wants to introduce her son Lior to Ehud, the son of Neal. The method may include some or all of the following, suitably ordered e.g. as shown:

a. the Email addresses of Neal (Father of Ehud) and Sara have been entered to the system and associated with the respective children by an authenticated person with the proper role, prior to the start of this method.

b. Sara Invites Neal (father of Ehud). Sara identifies Neal by the combination of Ehud's name and Neal's email. The system tries to identify the child by the father's email address and the child's first name (the exact matching criterion may be suitably defined e.g. the first x letters (prefix) need to match).

c. If the child was not found, the system lets Sara know that Ehud, son of Neal, is not registered to the system and gives Sara at least one of the following two options: 1. An opportunity to modify the request if Sara believes Ehud is registered but she has erroneously given wrong particulars; and/or 2. An opportunity to invite Neal to join/register with the service.

d. If option #2 was selected by Sara, the system sends a proposition mail to the email of Neal (father of Ehud) the email including the name of Ehud and a link to the registration site, including a special GUID that connects to this request.

e. If the system succeeded in identifying the child (Ehud), the system sends mail to Neal (father of Ehud) with an invitation. The system may create an invitation in Ehud's address book (the parental part). The invitation may include some or all of: Neal's email address; Sara's email address; the identity of the two children; Ehud's name—if this is a proposition to join; and/or free text that Sara is prompted to add to the invitation d. Neal accepts the invitation; Neal registers Ehud and creates a new student.

e. Neal enters the parental part of the new student's address book and looks at the place that displays the awaiting invitations. All pending invitations are displayed. The parent selects the relevant invitation to this child.

f. a prefix (at least) of the child name is compared to the name on the invitation. If these match, the invitation may be updated and may contain the identity of new student in the system.

g. The parent approves the invitation. Entries are created in an address book that connects the two children h. The inviting parent receives a mail that his invitation has been approved.

Any suitable login subsystem may be provided, e.g. to serve the systems of FIG. 1 and/or FIG. 2 or any other embodiment described herein. The login subsystem may for example use a suitable technology such as signed cookies (created e.g. on the server) to enable the system to support a single sign on between the various functionalities and/or sites that provide the service.

The system may support several user roles e.g. all or any subset of the following role System Administrator—this role enable to manage the system. It enables to create modify and delete accounts of all types and to reset passwords ("trusted authority")

Organization administrator—Organization administrators can create classes, assign them to teachers and access organizational statistics.

Teacher ("trusted user")

Parent (may be external recipient)

Staff member

Student ("child user")

Content Management User

Two separate levels of Login may be supported: Primary Login and Secondary Login;

so as to define separate modes such as class mode and home mode. Primary login typically uses a conventional username and password scheme. If the user identifies himself during primary login as a teacher then typically

```
{
    Secondary Login happens, e.g. some or all of:
    The system shows the list of students and requests a secondary identification.
    The identification includes selecting the student name from the list that is shown (the
class list + teacher + staff)
    and then the appropriate login is shown and the password as entered is checked.
    IF correct password has been clicked
    {
        The system marks to itself that it is in "Class Mode" and marks the student
that is now working.
            (by means of StudentID and signed cookie -
            so from here on each access to the server has two approved Identities:
            Teacher + Student to show that system is in class mode and
            give the class identity (classes are typically identified by
            teacher since teacher is unique to class) and the identity of the
            student that is now working).
        The user is transferred to an initial page for the child-user e.g. an
application selection page-("What would you like to do now").
    }
}
Else if the user identify himself during the primary login as a student then
{
    The system marks to itself that it is in "Home Mode" and Marks the student that is
now working.
    The user is transferred to an initial page for the child-user e.g. the application
selection page - (What would you like to do now).
    At this stage when in home mode, the parent / adult carer can login using a PIN-
based a secondary login process; analogously, a teacher can typically log in, identifying
himself or herself using her or his PIN, when the child is at kindergarten, working in
class mode.
}
```

Typically, when a user logs in (primary login) to the system (SSL is enforced—so as not to pass credentials in the clear) the user credentials (username and password) are checked (password may be stored securely e.g. using a one way encryption algorithm (to disable the ability of retrieving user passwords). If the credentials are matched, the server typically creates a "login cookie". The cookie typically includes user id cookie expiration time which is typically encrypted and signed. The signature is typically added to the cookie. The cookie is typically returned as part of the response to the login request, typically together with a success indication whereas in case of failure, there is typically no indication of whether the username and/or password were incorrect.

From that point, each request that the client sends to the server typically includes the "login cookie". The server validates the signature, and, if correct, typically entitles the user that is assigned to it to grant the right permissions to that user (for example access to personal data—private address book, class resources etc.).

Teacher credentials typically enable teachers, once they have authenticated themselves e.g. by entering a PIN, e.g. to a work-session of a child end-user associated with that teacher, to perform teacher's functions which may include some or all of:

a. Manage the class definitions (for example manage the student list, define for each student his responsible adult email address, send student user names and passwords to the responsible adults.) and/or b. Use the tools with the teacher's identity (for example read the email sent to the teacher and reply to the students, define new charts and polls using how much/how many).

c. Student's functions: students may use the system in "class mode" as opposed to using the system in "home mode" (from home). Typically these modes are not child-user selectable; instead different login levels are typically required.

When students use the system from home, they log in with their credentials which grant them a role of student. This allows them to use the tools from home. Not all activities that are defined for usage in class are necessarily open for usage at home, and not all home activities are necessarily open in the class. For example, the system might be configured such that private address book is managed only from home mode, or teachers can decide to use some of their polls only in "class mode".

Typically, when students use the system at class, they need to identify themselves. The system typically displays a list of all students, typically also of the teacher and the staff. Each name (student/teacher/staff) can be accompanied by a symbol or a picture.

The invention herein is not limited to any particular role (type of end user e.g.) or set of roles. For example, end-users may be deemed by the system to play any or all of the following roles:

The teacher and/or trusted authority, only, can activate a process that automatically creates users and assigns usernames and passwords to each child (and, optionally, staff member) in the class address book. This process creates a user per student such that each student has his own identity—giving her or him exclusive access to his mail, his private storage, his address book ("ab"), his class resources and to the system. Once the process has been activated, students can login from home and use the system.

Teachers: typically, have ability to send email to children and to the responsible adults of a child individually or to all responsible adults of a class. They typically do not have access to the private address books (student's family members or friends) of children in their class—do not maintain or see same and cannot send email thereto. Typically, teacher can access ChildUI but cannot access UI of the child's parent e.g. parent has her or his own PIN provided to the parent by an automatic process transparent to the teacher.

child: can send and receive emails only from people that are in the address book/s defined for him. Thus can send email only to their responsible adults & family members, and to those in the class address book parents: have access only to their own child's private address book which they maintain. Parents can access child UI.

The teacher may use a single icon to mark each child's allocated portion of shared physical resources in the school building. For example, an elephant might be used to mark each of the resources allocated to Josiah, such as "his" chair, cubby, coat-hook, towel-hook and workbook. A pitchfork might be used to used to mark the same for Sarah. According to certain embodiments, the same icons may be used to identify Josiah, Sara and other children respectively within the networking functionality—Josiah is identified by the elephant which all children in the class already associate with him, Sara by the pitchfork which all children in the class already associate with her, and so forth.

A particular advantage of certain embodiments is that children can be taught safety rules and ethical rules within a safe environment such that beginner violations of these rules do not have the serious consequences that the same violations have when children learn the same rules using a non-protected computerized social network. For example, conventionally, a child who violates safety rules using conventional social networks such as Facebook or email, or conventional networked information systems such as unfiltered Internet, may run the risk of coming into contact with a pedophile or with pornographic content respectively. In contrast, a child using a system provided in accordance with certain embodiments does not run these risks because the child's access to others via the social network is restricted only to those defined for her or him by trusted adults. While in this safe environment, the child learns how to protect himself, and not endanger or inconvenience others, safely.

According to an embodiment of the invention, a trusted authority such as a governmental ministry of education or local board of education pre-defines each teacher within a population of teachers, for the system. Each teacher-user so defined is given access to a teacher user interface which is operative to allow only teacher-users to each define a protected class environment within which the teacher-user pre-defines a child-user for each of her pupils. Typically, the teacher UI allows each teacher to enter, for each pupil, the pupil's name and to select an icon to represent that pupil such as a rose, sailboat, motorcycle or spoon. The teacher user also defines, per pupil, at least one trusted adult entity responsible for that pupil, including the adult entity's contact information (e.g. email address) and an alias identifying the adult entity for the child, such as "daddy and mommy" or "daddy" or "mommy" or "Aunt Sarah" e.g. if Aunt Sarah is known by the teacher to be the child's guardian. Typically, the teacher might identify two adult entities having "daddy" and "mommy" aliases respectively if the child's parents are divorced, but might identify only one adult entity, alias "mommy and daddy", for a child whose parents both live with her or him. Any suitable rules may be pre-defined to determine whether both parents in a divorced couple, or either one, suffice in order to authorize a child to communicate with a child in another class or with his dad's brother, Uncle Jonah.

It is appreciated that in the illustrated embodiment, the default internal recipient whitelist for each child is the children in his class. However, alternatively, the default whitelist might be empty and each parent (or pair of parents) needs to whitelist communication between children a and b even in the same class. According to some embodiments, a blacklist option is provided, whereby parents can remove default or previously authorized internal recipients from their child's current whitelist. Typically but not necessarily, when the child enters email mode, he is shown (a pictorial representation of) all recipients, or all internal recipients, in his current whitelist.

According to certain embodiments, a child's parent is unable to use a session opened by a child, or to use her or his child's credentials, which may be known to him to open such a session, so as to send emails to a child's friends. For example, access to the child's whitelist (address book) might be blocked, using any suitable known technology, if the child logs in from home rather than from the classroom, since no parents are present in the classroom.

It is appreciated that any and all of the data repositories herein e.g. those storing credentials and personal particulars of a child and other users, may be stored centrally and/or locally, and the data structure may be designed inter alia to take into account whichsoever privacy considerations may govern in any particular use-case.

PINs for each teacher-user may be assigned in an initialization stage, by a trusted authority.

According to certain embodiments, an initial login screen is provided which is uniform for all roles/types of users (internal recipients e.g.) including some or all of: teachers, children, other workers. The initial login screen may or may not also serve external recipients such as parents or other family members who are not members of any class. The initial login screen may prompt each user to provide her or his username and password. Typically, the system stores, in computer memory, an indication of user roles; if a user is a child, the system (e.g. upon receipt of the child's username) shows the child the picture or image stored, and prompts the child to enter "his" locations within that image. If the user is an adult, the system may simply await receipt of the user's username and password (PIN), as is conventional. Typically, each role has its own mode or environment; so once a user has logged in successfully, the system then displays a screen that suits that user's role such as a teacher's screen or a "what do you want to do?" screen for a child, or a "modify your child's whitelist" screen for a parent.

It is appreciated that spam emails typically cannot reach a child called Jane, other than spam emails generated by children on Jane's whitelist, since communication between internal recipients typically takes place via the dedicated server of the system shown and described herein rather than via SMTP (or any other external communication protocol such as but not limited to conventional protocols used for or by Whats-app, Facebook or SMS or variations thereupon).

It is appreciated that certain embodiments are described herein as email embodiments, however this is merely for simplicity. More generally, the system shown and described herein comprises a child-safe communication architecture/environment/network which limits each child's ability to communicate only to pre-approved recipients according to a predefined scheme (e.g. as described herein) of how recipients are pre-approved and by whom (parent/system/teacher).

As described, some recipients may be semi-approved i.e. may communicate with the child only under certain limitations, such as but not limited to, teacher approval before the communication actually reaches the child. However, the communication network may be cocooned within a larger legacy general communication network e.g. the child may "send a communication to" an external recipient who is not part of the child-safe network e.g. by selecting the external recipient from the child's whitelist, and interfacing with the user interface provided by the child-safe communication environment; responsively, the server of the child-safe communication environment sends e.g. emails (or Whats-app, Facebook or SMS or variations thereupon) of the child's communication to the external recipients, and provides support for sending a response from the external recipient to the child e.g. by adding to the email a link leading to a web-page within a website associated with the child-safe communication environment; via this web-page the external recipient may communicate with the child; but the child's experience is of receiving an email (say) from the external recipient; typically the environment displays to the child an inbox including all communications sent to the child, whether internally or by external recipients, and, similarly, from the child's standpoint the environment (system) typically displays a single address book/whitelist including both internal and external recipients; however the difference therebetween is transparent to the child.

It is appreciated that according to certain embodiments, a child's address book may be used for any or all of: emails; other one-to-one messaging, forums, chatrooms; facebook-type communication and so forth.

The applicability of the system/environment shown and described herein need not be limited to email, Whats-app, Facebook or SMS or variations thereupon, and may more generally be employed for any sort of electronic or digital communication between end-users e.g. at any layer of the network.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited to, those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A secure social networking system for pupils including:
a server comprising a mail server and a gateway, the mail server including a processor, operative to:
  a. communicate with external recipients via the gateway to at least one external communication network serving the external recipients; and
  b. communicate with at least one internal recipient including pupil end-users, thereby to define an internal secured network;
computer memory/storage accessible by the server and operative to store:
  associations between parent end-users who are nodes in the at least one external communication network and individual internal recipients from among the pupil end-users, thereby to associate at least one parent end-user of the parent end-users with each pupil end-user of the pupil end-users; and
  whitelists of authorized communicants for the pupil end-users, provided by the server;
wherein the mail server is operative to interface with:
  a secured parent environment including a parent's user-interface for the parent end-users, operative, responsive to control by a processor, to allow a given parent end-user from among the parent end-users whose association with a given pupil end-user from among the pupil end-users is stored in said memory, to authenticate himself and subsequently to define for the server, a white-list of pupil end users with whom the given parent end-user authorizes the given pupil end-user, to communicate; and a secured pupil environment including a pupil's user-interface, operative, responsive to control by a processor, to allow a first pupil end-user to communicate via said server with any of the pupil end-users appearing on a whitelist of internal recipients stored in the memory for the first pupil end-user;

wherein for at least one first and at least one second pupil end-user from among the pupil end-users, the server's logic is configured such that the whitelist provided to the memory for the first pupil end-user includes the second pupil end-user, if both the parent end-users associated with the first and second pupil end-users have each, via their respective parent's user-interface, authorized communication between the first and second pupil end-users, thereby to define the first and second pupil end-users as an authorized pair of communicants, wherein the mail server and gateway allow outgoing communication with external networks and the gateway comprises a one-way gateway which does not allow incoming communication, thereby to generate an internal network secured from incoming communication from the external networks, an identity manager is associated with the email server and is operative to control access of users depending on their roles as stored in computer memory, and subject to their providing authentication, a default internal recipient whitelist associated with each of the pupil-end users includes a plurality of pupil end-users of an individual class associated with the pupil end user, and the system is pre-configured such that no communication is possible other than communication between authorized pairs of communicants and wherein rules defining authorized pairs of communicants includes that pupil end-users of the individual class can all communicate with one another, the system including a pupil database storing a pupil data record for each of pupil end-users in a supported pupil population and wherein each pupil data record is operative for storing the association between each of the pupil end-users and the individual class.

2. A system according to claim 1 and also comprising a secured teacher environment including a teacher's user-interface operative, responsive to control by a processor, to allow a teacher end-user of a plurality of teacher end-users, pre-defined by a trusted authority, to define the individual class having the plurality of pupil end-users including defining, for each of the pupil end-users in the plurality of pupil end-users, a pupil's contact information; and parent contact information through which the server contacts the parent end-user associated with the pupil end-user via the external communication network.

3. A system according to claim 1 wherein, for any pair of first and second pupil end-users from among the pupil end-users associated with different individual classes of a plurality of individual classes, the server's logic is configured such that the whitelist provided to the memory for the first pupil end-user includes the second pupil, if and only if both the parent end-users associated with the first and second pupil end-users have each, via their respective parent's user-interface, authorized communication between the first and second pupil end-users, thereby to define the first and second pupil end-users as an authorized pair of communicants.

4. A system according to claim 1 and also comprising a workstation operative to communicate with the server via the external communication network and operative to provide one of the parent end-users with the secured parent environment including the parent's user-interface operative to allow the one of the parent end-users, once his association with one of the pupil end-users is stored in said memory, to authenticate himself and subsequently to define the one of the pupil end-users with whom the parent end-user authorizes the one of the pupil end-users to communicate.

5. A system according to claim 2 wherein the parent user-interface is operative:

to allow the given parent end-user whose association with the given pupil and a given individual class defined by said teacher user-interface, to send requests, through the system, to parents of the pupil end-users belonging to individual classes other than said given individual class asking those parent end-users to authorize the pupil end-users with whom those parent end-users are associated respectively to communicate with the given pupil end-user; and to allow a particular parent end-user of the parent end-users who has received an individual request sent by the given parent end-user, to approve the individual request, thereby to define the given pupil end-user and the pupil end-user associated with the particular parent end-user as an authorized pair of communicants.

6. A system according to claim 2 and also comprising an internal communication system supporting communication among registered pairs of teacher end-users from among said plurality of teacher end-users which are pre-defined as authorized pairs of communicants.

7. A system according to claim 2 and also comprising an introduction functionality operative to:

receive, from the teacher end-user, externally provided contact information that the parent end-users previously provided to the teacher end-user;

store the externally provided contact information; and facilitate transmission of introductory messages, from the teacher end-user, to each of the parent end-users associated with the plurality of pupil end-users in the individual class, using said externally provided contact information, wherein the introductory message sent to each of the parent end-users, assigns to each of the parent end-users a user name and password, granting each of the parent end-users access to said parent-user interface.

8. A system according to claim 7 wherein said contact information comprises an email address.

9. A system according to claim 7 wherein said contact information comprises a cell phone number.

10. A system according to claim 1 and wherein said computer memory includes:

a teacher database including a teacher data record for each teacher end-user in a supported teacher population and wherein each teacher data record is operative for storing a teacher's contact information;

the pupil data record for each of the pupil end-users in the supported pupil population and wherein each pupil data record is operative for storing a pupil's contact information and an association between the pupil end-user and an individual teacher end-user in the supported teacher population; and a parental database including a parent data record for each of the parent end-users in a supported parent population and wherein each parent data record is operative for storing a parent's contact information and an association between the parent end-user and an individual pupil end-user in the supported pupil population.

11. A system according to claim 5 wherein, if an individual parent end-user of the parent end-users is known to be logged in to the system, the individual parent end-user is brought straight to a web-page within the parent user interface which enables the individual parent end-user to authorize contact with whichsoever of the pupil end-users whose associated parent end-users have requested contact with the pupil end-user associated with the individual parent end-user.

12. A system according to claim 5 wherein, if an individual parent end-user of the parent end-users is deemed not to be logged in to the system, the individual parent end-user is routed first to a login page of the parent user interface login page, and only subsequently, to a web-page within the parent user interface which enables the individual parent end-user to authorize contact with whichsoever of the pupil end-users whose associated parent end-users have requested contact with the pupil end-user associated with the individual parent end-user.

13. A system according to claim 1 and also comprising a workstation operative to communicate with the server via the internal secured network and operative to provide a secured pupil environment including a pupil's user-interface operative to allow each of the pupil end-users to communicate via said server with any of the pupil end-users appearing on the whitelist of internal recipients stored in the memory associated with the pupil end-user.

14. A system according to claim 1 wherein the system is pre-configured such that no communication between the users is possible other than communication between authorized pairs of communicants.

15. A system according to claim 14 wherein authorized pairs of communicants include any pair of pupil end-users of a single teacher.

16. A system according to claim 14 wherein authorized pairs of communicants include any pupil end-user and her/his teacher end-user.

17. A system according to claim 14 wherein authorized pairs of communicants include any of the pupil end-users and her/his parent end-user.

18. A system according to claim 1 and wherein said computer memory includes:
a teacher database including a teacher data record for each teacher end-user in a supported teacher population and wherein each teacher data record is operative for storing a teacher's contact information.

19. A system according to claim 1 and wherein said computer memory includes:
a pupil database including a pupil data record for each of the pupil end-users in a supported pupil population and wherein each pupil data record is operative for storing a pupil's contact information and an association between each of the pupil end-users and an individual teacher end-user in a supported teacher population.

20. A system according to claim 1 and also comprising a gateway via which the mail server communicates with the external recipients and wherein the gateway is one-way allowing the individual internal recipients to send communications via the server to at least some of said external recipients but not allowing external recipients to send communications to the individual internal recipients.

21. A computer program product, comprising a non-transitory tangible computer readable medium having computer readable program code embodied therein, said computer readable program code adapted to be executed to implement a secure social networking method for pupils including:
controlling a mail server including a processor, to:
   a. communicate with external recipients via a gateway to at least one external communication network serving the external recipients; and
   b. communicate with at least one internal recipient including pupil end-users, thereby to define an internal secured network; and
controlling storage, in computer memory/storage accessible by a server, the server comprising the mail server and the gateway, of:
associations between parent end-users who are nodes in the at least one external communication network and individual internal recipients from among the pupil end-users, thereby to associate at least one parent end-user of the parent end-users with each pupil end-user of the pupil end-users; and
white-lists of authorized communicants for the pupil end-users, provided by the server operative to interface with:
   i. a secured parent environment including a parent's user-interface, operative, responsive to control by a processor, to allow a given parent end-user of the parent end-users whose association with a given pupil end-user from among the pupil end-users is stored in said memory, to authenticate himself and subsequently to define for the server, a white-list of pupil end-users with whom the given parent end-user authorizes the given pupil end-user to communicate; and
   ii. a secured pupil environment including a pupil's user-interface, operative, responsive to control by a processor, to allow a first pupil end-user to communicate via said server with any of the pupil end-users appearing on a whitelist of internal recipients stored in the memory for the first pupil end-user;
wherein for at least one first and at least one second pupil end-user from among the pupil end-users, the whitelist provided to the memory for the first pupil end-user includes the second pupil, if both the parent end-users of the first and second pupil end-users have each, via their respective parent's user-interface, authorized communication between the first and second pupil end-users, thereby to define the first and second pupil end-users as an authorized pair of communicants,
wherein the mail server and the gateway allow outgoing communication with external networks and the gateway comprises a one-way gateway which does not allow incoming communication, thereby to generate an internal network secured from incoming communication from the external networks.

22. The computer program product according to claim 21, wherein an identity manager is associated with the email server and is operative to control access of users depending on their roles as stored in computer memory, and subject to their providing authentication.

23. The computer program product according to claim 21, wherein a default internal recipient whitelist associated with each of the pupil-end users includes the plurality of pupil end-users of an individual class associated with the pupil end user.

24. The computer program product according to claim 21, wherein the system is pre-configured such that no communication between users is possible other than communication between authorized pairs of communicants and wherein rules defining authorized pairs of communicants include that the pupil end-users of a single teacher can all communicate with one another.

25. The computer program product according to claim 21, the system including a pupil database storing a pupil data record for each of the pupil end-users in a supported pupil population and wherein each pupil data record is operative for storing an association between each of the pupil end-users and an individual class.

26. A secure social networking method for pupils including:

Using a server including a mail server and a gateway, the mail server including a processor, to:
  a. communicate with external recipients via the gateway to at least one external communication network serving the external recipients; and
  b. communicate with at least one internal recipient including pupil end-users, thereby to define an internal secured network; and storing, in computer memory/storage accessible by the server:
  associations between parent end-users who are nodes in the at least one external communication network and individual internal recipients from among the pupil end-users, thereby to associate at least one parent end-user of the parent end-users with each pupil end-user of the pupil end-users; and
  white-lists of authorized communicants for the pupil end-users, provided by the server operative to interface with:
    i. a secured parent environment including a parent's user-interface, operative, responsive to control by a processor, to allow a given parent end-user of the parent end-users whose association with a given pupil end-user from among the pupil end-users is stored in said memory, to authenticate himself and subsequently to define for the server, a white-list of pupil end-users with whom the given parent end-user authorizes the given pupil end-user to communicate; and
    ii. a secured pupil environment including a pupil's user-interface, operative, responsive to control by a processor, to allow a first pupil end-user to communicate via said server with any of the pupil end-users appearing on the whitelist of internal recipients stored in the memory for the first pupil end-user;

wherein for at least one first and at least one second pupil end-user from among the pupil end-users, the whitelist provided to the memory for the first pupil end-user includes the second pupil, if both the parent end-users associated with the first and second pupil end users have each, via their respective parent's user-interface, authorized communication between the first and second pupil end-users, thereby to define the first and second pupil end-users as an authorized pair of communicants, wherein wherein the mail server and gateway allow outgoing communication with external networks and the gateway comprises a one-way gateway which does not allow incoming communication, thereby to generate an internal network secured from incoming communication from external networks, and an identity manager is associated with the email server and is operative to control access of users depending on their roles as stored in computer memory, and subject to their providing authentication.

27. The method according to claim 26 wherein when the parent end-users conduct a defining process to define their associated pupil end-users as a pair of authorized communicants, email addresses of the parent end-users having been entered to the system and associated with the respective pupil end-users by an authenticated user having this role, the server responsively adds the respective pupil end-users to each other's whitelist.

28. The method according to claim 27 wherein said process comprises:

responsive to an inviting parent end-user of the parent end-users inviting an invited pupil end-user of the pupil end-users including a name of an inviting pupil end-user of the pupil end-users associated with the inviting parent end-user and an inviting email address of the inviting parent end-user, the server uses a matching criterion to identify the inviting pupil end-user by the inviting email address of the inviting parent end-user and the name of the inviting pupil end-user, for each of the pupil end-users not identified, the system lets the inviting parent end-user know and gives the inviting parent end-user an option to send a proposition mail to an invited email address of an invited parent end-user associated with the invited pupil end-user including a link to a registration site, including a global unique identification; and when the server identifies the invited pupil end-user, the server sends an invitation email to the invited parent end-user, if the invitation email is approved by the invited parent end-user, address book entries are created that connect the inviting pupil end-user and the invited pupil end-user.

* * * * *